3,043,857
PREPARATION OF HYDRIDES OF THE FOURTH
AND FIFTH GROUP ELEMENTS
Herbert Jenkner, Hannover-Wulfel, Germany, assignor
to Kali-Chemie Aktiengesellschaft, Hannover, Germany
No Drawing. Filed Oct. 30, 1957, Ser. No. 693,257
Claims priority, application Germany Nov. 3, 1956
9 Claims. (Cl. 260—429.7)

The invention relates to the preparation of hydrides of the fourth and fifth group elements, more particularly to the preparation of silanes, germanes, and stannanes, and partially substituted derivatives thereof.

According to the invention, halides of silicon, germanium, and tin are reacted with alkali metal hydride in the presence of a metal-organic compound of the third group elements, which compounds act as promoter or catalysts and allow of carrying out the reaction at the relatively low temperatures of 40 to 180° C., preferably between 70 and 120° C.

Though any alkali metal hydride and mixtures thereof may be used, I will describe in detail the reaction only with sodium hydride, because this compound is the cheapest and the most useful alkali metal hydride for this reaction and therefore particularly suitable for carrying out the reaction on a commercial scale.

Heretofore, it has been not possible to use sodium hydride generally for hydrogenating reactions of the character here involved because it is insoluble in all conventional organic solvents and could not be reacted with the halides at relatively low temperatures. The required high temperatures were too close to the decomposition temperature of the sodium hydride and particularly too close to the decomposition temperature of the thermally instable hydrides to be obtained. Under the conditions here described, the sodium hydride is completely reacted; the reaction proceeds gently, and no surge reactions take place which would decompose the end products. For the same reasons, conventional apparatus can be employed.

The sodium hydride is advantageously used in the finely divided state. However, it may also be employed in the form of coarse grains, particularly for large batches, but in this case the rate of reaction is, of course, somewhat reduced; this may be counteracted by vigorous stirring of the suspension. For the reaction, any halides of those fourth and fifth group elements can be used that form hydrides which are stable under the conditions of the reaction and can be distilled or extracted. Suitable silicon halides are, for instance, $SiHal_4$ (where Hal is particularly fluorine or chlorine but may be also bromine or iodine), or $SiHal_aX_bX'_c$ where Hal is the same as above, and X and X' designate the same or different atoms or groups selected from hydrogen, alkyl, aryl, substituted alkyl such as chloroalkyl, substituted aryl such as chlorophenyl, vinyl, alkoxy, isoalkyl, alicyclic, aralkyl such as benzyl, and others, whereby $a+b+c=4$. Other suitable silicon halides are the chlorosiloxanes, such as $Cl_6Si_2O$, chloropolysiloxanes, chlorinated disilanes such as $Si_2Cl_6$, halogenosilcarbanes such as $Cl_3Si(CH_2)_xSiCl_3$, $(SiCl)_x$. This recitation is illustrative but not to be considered limitative. The same types of compounds may be used of other elements of the fourth and fifth group, particularly germanium.

As stated above, the hydrides must be stable under the conditions of the reaction. The reaction is, therefore, not very suitable for the preparation of hydrides of Pb, Ta, Bi, Th, neither is it suitable for the preparation of hydrocarbons from carbon halides.

As promoter, activator or catalyst, I use organic compounds of the third group elements, particularly those of aluminum, boron, and gallium. These compounds may be added to the reaction mixture or prepared therein. Particularly suitable are compounds of the formula $MeR_xR_y'(X+Y=3)$, wherein Me is the third group element, and R and R' may designate the same or different atoms or groups. R and/or R' may be alkyl such as methyl, ethyl, propyl, isopropyl, butyl, hexyl, or higher alkyls, alkoxy such as methoxy, ethoxy, propoxy, phenoxy and the like; R also hydrogen provided that an organic $R^1$ group is present. Also organic addition compounds of said compounds may be used. Many of such addition compounds are known, particularly suitable are the etherates.

A particular advantage of said promoters or activators is that already in very small amounts they steer the reaction into the desired direction. Already 1 mol percent of said compounds, particularly of the B and Al compounds, added to 1 mole of NaH may be sufficient. Of course, larger amounts, such as 5 to 25 mol percent, calculated on 1 mole of NaH, may be added, and in the case of slowly reacting halides, it may be of advantage to add 40–60 or even up to 200 mol percent. Instead of the recited promoters, also their complex compounds with sodium hydride may be used, such as the compounds $NaH \cdot BR_3$; $NaH \cdot Al(OR)_3$; $NaH \cdot AlR_3$; $NaH \cdot AlR_2H$, and others, where R has the significance set forth above.

The recited promoters or activators are capable of dissolving at least part of the sodium hydride; upon reaction of the NaH with the halide, said compounds are released and react at once with fresh NaH to convert the same into a dissolved state suitable for the reaction. Particularly strong activators are the boron and aluminum alkyls, which produce the best yields in reactions involving slowly reacting halides. Somewhat less active are boric esters, which, however, have the advantage of not igniting spontaneously. The least active promoters are the aluminum alkoxides. If fluorides are used as components of the reaction, I prefer to use boron compounds as activators.

The reaction is carried out in the presence of solvents or diluents. Although it is preferred that employed liquids are solvents for the halides of the fourth and fifth group elements, this is not absolutely necessary. The liquids serve as suspending medium for the sodium hydride. It is also possible to suspend the sodium hydride in a liquid other than the solvent for the halides. However, I prefer to use the same liquid both as solvent and suspending medium.

All those liquids are suitable as solvents and/or suspending medium which do not react either with the starting materials or the end products. Unsuitable, therefore, are water, inorganic and organic acids, alcohols, phenols, thiophenols, mercaptans, aldehydes and the like. Suitable liquids are hydrocarbons and halogenated hydrocarbons free from non-benzenoid unsaturation, such as hexane, octane, dodecane, benzene, toluene; triethylsilane, tetraalkylsilanes, such as tetraethylsilane, tetrapropylsilane, and others, dipropylsilane, methyl naphthalene, mineral oils, particularly those having a high boiling point, and many others. I prefer to use solvents which have a boiling point higher than the hydride to be prepared (at least more than 10–20° C., better 50 to 100 up to 200° C.). On the other hand, the hydride to be prepared can itself be used as solvent and suspending agent.

The reaction can be carried out at normal pressures, preferably in an atmosphere of a protecting gas such as argon, nitrogen, helium, hydrogen, and the like. If higher rates of reaction are desired, it may be of advantage to work under elevated pressures. On the other hand, in the preparation of heat-sensitive hydrides, for instance of stannanes, it may be of advantage to apply vacuum or reduced pressure. In this case, it may be of further advantage to operate at low temperatures between −20 and +40° C.

In the preparation of volatile hydrides such as $SiH_4$, $SiC_2H_5H_3$ and similar compounds, the following procedure is preferred. Several reaction vessels charged with NaH+diluent+promoter are connected in series, and the gaseous halide is passed through the reactors, preferably with vigorous stirring. About 90 percent of the halide react already in the first reactor, the remaining 10 percent in the second or third reactor. As the reactors are connected in series, high rates of reaction can be attained. The last reactor of the series preferably is not charged with the promoter so that it can absorb any promoter carried away by the gases from the preceding reactors. The halide can be introduced into the first reactor until the sodium hydride has been completely reacted; of course, if most of the sodium hydride has been consumed, only small amounts of the halide are hydrogenated in said reactor. This is of little importance as the hydrogenation proceeds in the succeeding reactors. After complete consumption of the sodium hydride in the first reactor, said reactor may be shut off. The suspended sodium halide is separated from the diluent by centrifugation or filtration, or the diluent is removed from the sodium halide by dissolution or distillation. The reactor is then again charged with sodium hydride and diluent, preferably without promoter, and is connected to the end of reactor series. In this way, the process may be carried out quasi continuously. The loss of promoter, if it is very volatile, is reduced to a minimum, and in spite of high rates of reaction the obtained hydride is free from halogen.

The invention is illustrated by the following examples, in which parts are by weight.

Example 1

94 parts of a 37.8% suspension of sodium hydride in a mineral oil of a boiling range of 190–240° C. at a pressure of 1 mm. were diluted with 120 parts of mineral oil, and 5 parts of triethyl aluminum were added to the suspension. The mixture was then heated at 110° C. Subsequently, a solution of 102 parts of diethyl dichlorosilane, diluted with 50 parts of mineral oil, was added dropwise with stirring. The reaction started at once; the mixture was cooled and had at the end of the reaction a temperature of 90° C. The reaction time was half an hour. There were obtained 54.2 parts (=94.6% of theory) of pure diethylsilane $(C_2H_5)_2SiH_2$, free from chlorine.

Example 2

To 80.5 parts of 37.8% sodium hydride in a mineral oil ($b_1$=190–240° C.) were added 100 parts of mineral oil and 5 parts of triethyl borine. Then 62 parts of ethylthichlorosilane were added at a temperature of 80–90° C. There were obtained 19.5 parts=85.5 of theory of pure, chloride free ethyl silane $C_2H_5SiH_3$.

Example 3

Example 1 was repeated but the diethyl dichlorosilane was replaced by silicon tetrachloride. Silane, $SH_4$, was obtained in more than 95% yield.

Example 4

A suspension of 20 parts of sodium hydride in 80 parts of the same mineral oil as used in the preceding examples was mixed under stirring with 4 parts of triethyl borine and heated at 140° C. Then a solution of 40 parts of diethyl difluosilane in 30 parts of mineral oil was added dropwise over a period of 1.5 hours. On distillation, 26.4 parts (=92.5% of theory) of pure fluoride-free diethyl silane were obtained.

Similar good yields of diethyl silane are obtained when sodium hydride is activated by 5 parts of tributyl borine.

If triethyl fluosilane or triphenyl fluosilane are used instead of diethyl fluosilane, triethyl or triphenyl silane, respectively, are obtained in a yield of more than 95%.

Example 5

9 parts of triethyl borine are introduced into a well stirred suspension of 75 parts of sodium hydride in 220 parts of a mineral oil boiling in the range of 190–240° C. under 1 mm. pressure. After the reaction mixture had been heated at 120–140° C. 77 parts of gaseous ethyl trifluosilane were passed thereinto within a period of 3 hours. There were obtained 39 parts of ethyl silane, $C_2H_5$—$SiH_3$, corresponding to a yield of 96.3%.

By the same general procedure, other gaseous or easily volatilized halogen compounds of Si, Ge, Sn may be reacted with sodium hydride. The rate of admission of the gas will depend on the speed of stirring, the reaction temperature, the catalyst used, the grain size of the sodium hydride, the required purity of the obtained hydride, and other conditions of the reaction. It is useful to connect several reaction vessels in series, as described above in the specification, in order to obtain silanes completely free from halogen at high rates of admission, complete conversion of the sodium hydride, and complete removal of the catalyst such as triethyl borine. The reacted sodium hydride suspension can be removed by filtration, centrifugation and the like under atmospheric conditions.

Example 6

42 parts of diethyl dichlorosilane, diluted with 30 parts of mineral oil ($b_1$=190–290° C.), are added dropwise over a period of 1 hour to a suspension of 20 parts of sodium hydride and 6 parts of methyl borate in 70 parts of said mineral oil, which suspension had been preheated to 150° C. and was kept in agitation. There are obtained 21.6 parts of chloride-free diethyl silane.

Example 7

40 parts of a 50% suspension of sodium hydride in a mineral oil ($b_1$=190–240° C.) are diluted with 45 parts of the mineral oil. 4 parts of triethyl borine are added as activator. At a temperature of 70° C., 86.4 parts of triethyl chlorostannane, diluted with 45 parts of mineral oil, are introduced in small portions with stirring. On distillation in vacuo, 63.2 parts (95% of theory) of pure chloride-free triethyl stannane $(C_2H_5)_3SnH$ ($b_{21}$=46–48° C.) are obtained. This stannane derivative has not been known heretofore.

Example 8

250 parts of a solution of sodium hydride-triethyl aluminum in a mixture of equal parts of benzene and tetrahydrofurane, containing 7.85 parts of NaH, was contacted at room temperature with 16 parts of ethyltrichlorosilane, dissolved in 20 parts of benzene. In exothermic reaction, there were obtained 5.8 parts of ethyl silane, $C_2H_5SiH_3$, corresponding to a substantially theoretic yield.

Example 9

To 233 parts of a solution of sodium hydride-triethyl aluminum in benzene-tetrahydrofurane 1:1 (NaH content 7.6 parts), there were added dropwise at a temperature of about 70° C. 12.7 parts of silicon tetrachloride dissolved in 20 parts of benzene. Conforming to the rate of addition of the silicon tetrachloride, $SiH_4$ was generated in exothermic reaction. The yield was quantitative.

Example 10

To 100 parts of sodium hydride-triethyl borine, diluted with 65 parts of a mineral oil ($b_1$=190–210° C.) were added in small portions under stirring 86.5 parts of triethylchlorostannane at a temperature of 70–85° C. After the addition was completed, the obtained triethyl stannane was distilled off from the NaCl-mineral oil mixture in vacuo together with the split off triethyl borine. By fractionation (or by addition of 20 parts of NaH at 70–80° C.), 63 parts of triethyl stannane (about 95 percent of theory) were obtained.

If, instead of triethylchlorostannane, diethyldichlorostannane was employed at a temperature of 20 to 50° C., diethyl stannane was obtained in 50 to 60% yield.

Example 11

To a solution of 50 parts of $NaH \cdot B(C_2H_5)_3$ in 50 parts of tetrahydrofurane, there was slowly added at room temperature a solution of 17 parts of $SiCl_4$ in 17 parts of tetrahydrofurane. Conforming to the rate of addition of $SiCl_4$, silane was developed in exothermic reaction. There were obtained 3 parts of $SiH_4$, corresponding to a yield of 94 percent.

The tetrahydrofurane-triethyl borine mixture can be separated from the precipitated NaCl by centrifugation or distillation and used for preparing fresh $$NaH \cdot B(C_2H_5)_3.$$

Example 12

25 parts of ethyl trichlorosilane were added at room temperature in small portions with stirring to a solution of 64.3 parts of 96% sodium hydride-triethyl borine, dissolved in 55 parts of tetrahydrofurane. In exothermic reaction, 8.8 parts of pure chloride-free ethyl silane, $C_2H_5SiH_3$, were obtained, corresponding to 96% of the theoretic yield.

Example 13

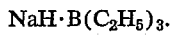

To 74 parts of 90% sodium hydride-triethyl borine, dissolved in 45 parts of tetrahydrofurane, there were added at a temperature of about 75° C. 30 parts of diethyl difluosilane over a period of 10 minutes. Diethyl silane was obtained in a yield of more than 95%.

If the diethyldifluosilane was replaced by diethyldichlorosilane, diethylsilane was obtained in similar yields.

If $SiF_4$ is reacted with $NaH \cdot B(C_2H_5)_3$ in analogous manner, $SiH_4$ is obtained in yields of more than 90%.

Example 14

Example 1 was repeated but instead of triethyl aluminum, 6 parts of diethyl butyl aluminum were used as catalyst.

A diethyl silane was obtained in a yield of 88 percent.

Example 15

Example 4 was repeated but instead of triethyl borine, 6.5 parts of the methyl ester of dipropyl borinic acid were used as catalyst.

More than 25 parts of diethyl silane were obtained.

As set forth above, elevated temperatures in the range of about 60 to 180° C. will be employed when the promoter is used in small amounts. However, if large amounts of the promoter or catalyst are employed, for instance more than 80 percent calculated on the NaH, the reaction may proceed already at very low temperatures, for instance at temperatures of —20 to —40° C. In neither case is the promoter consumed by the reaction.

Example 16

21 parts of a 48% suspension of sodium hydride in mineral oil were mixed with 140 parts of octane and 41.60 parts of boron trimethyl. At a temperature of —10° C. 18 parts of hexachlorodisilane ($Si_2Cl_6$), diluted with 35 parts of mineral oil (of $b_1$ 180–200° C.) were added. 3.1 parts=75% of the theory of $Si_2H_6$ were obtained besides approx. 5% of $SiH_4$. By operating in a vacuum the yield may be improved.

Example 17

8.6 parts of a 48% suspension of NaH in a high boiling mineral oil ($b_1$ 200–240° C.) were reacted with a mixture of 17 parts of boron triethyl in 35 parts of mineral oil at 100° C. After cooling down to 0° C. 5.6 parts of germanium tetrachloride, dissolved in 12 parts of mineral oil, were added. Immediate reaction with separation of NaCl.

The $GeH_4$ obtained on cooling was thereupon conducted therefrom by distillation through a quartz tube heated up to about 800° C. 1.25 parts of pure germanium were obtained.

Example 18

36.2 parts of finly divided NaH were suspended in 210 parts of mineral oil (of $b_{12}$ 180–200° C.) and mixed with 7 parts of boron triethyl at a temperature of 110° C. Thereupon, between 85 and 95° C., 72 parts of technical vinyl trichlorosilane were introduced for 2 hours. In a connected cooling coil 21 parts of vinyl silane=84% of the theory were obtained.

Example 19

12.1 parts of sodium hydride, suspended in 140 parts of a technical mineral oil (of $b_1$ 200–220° C.), were mixd at about 110° C. with 7 parts of boron triethyl, whereupon within 1.5 hours a solution of 56 parts of diphenyldichlorosilane was dropped into 40 parts of mineral oil. 33.5 parts of diphenylsilane=84% of the theory could be obtained.

Example 20

28.5 parts of sodium hydride, suspended in 200 parts of a mineral oil (of $b_1$ 190–220° C.) were mixed at 75° C. with 121 parts of boron triethyl. After cooling down to —10–30° C. 53.5 parts of $PCl_3$, diluted with 35 parts of mineral oil, were dropped-in within 2.5 hours. After conclusion of the reaction the obtained $PH_3$ was drawn off in vacuo. 9.3 parts were obtained.

I claim:

1. A process for the preparation of hydrogen compounds of silicon, germanium, and tin, comprising reacting a halide of said compounds, said halide containing as only reactive groups halogen directly bound to said metal in an inert liquid organic diluent at a temperature of about —20 to +150° C. with sodium hydride in the presence of at least 1 mol percent, calculated on said sodium hydride, of an activator comprising a compound of the formula $MeR_xR'_y$, wherein Me is a member of the group consisting of boron, gallium, aluminum, $y$ being an integer from 1 to 3 and $x+y=3$, R is a member of the group consisting of hydrogen, lower alkyl, lower alkoxy, and phenoxy, and R' is a member of the group consisting of lower alkyl, lower alkoxy and phenoxy and isolating the obtained hydride.

2. The process as defined in claim 1 wherein an addition compound consisting of said sodium hydride and said activator is used.

3. The process as defined in claim 2 wherein said addition compound is $NaH \cdot B(C_2H_5)_3$.

4. The process as defined in claim 1 wherein a lower etherate of said activator is used.

5. The process as defined in claim 1 wherein said diluent is the hydride to be obtained.

6. The process as defined in claim 1, wherein halides of the formula $SiHal_nX_bX'_c$ and $GeHal_aX_bX'_c$ are used, werein Hal is halogen, $a$ is an integer from 1 to 4, $a+b+c=4$, and X and X' are members of the group consisting of hydrogen, alkyl, halogen-substituted alkyl, isoalkyl, alkenyl, alicyclic, aryl, halogen-substituted aryl, alkaryl and aralkyl groups.

7. The process as defined in claim 1 wherein the halides are members of the group consisting of chlorosiloxanes, chloropolysiloxanes, chlorosilcarbanes, and the corresponding germanium compounds.

8. The process as defined in claim 1 wherein the halides are compounds of the formula $SnHal_nX_b$ wherein $a$ is an integer from 2 to 3, $a+b=4$, and X a monovalent lower alkyl radical.

9. A method of preparing diethylsilane comprising reacting diethyl dichlorosilane with sodium hydride at a temperature of about 40 to 180° C. in a mineral oil suspension containing triethyl aluminum as a catalyst.

(References on following page)

References Cited in the file of this patent

UNITED STATES PATENTS

| | | |
|---|---|---|
| 2,699,457 | Ziegler et al. | Jan. 11, 1955 |
| 2,826,598 | Ziegler et al. | Mar. 11, 1958 |
| 2,857,414 | Schmidt et al. | Oct. 21, 1958 |
| 2,902,506 | Gilbert et al. | Sept. 1, 1959 |

OTHER REFERENCES

The Preparation and Some Properties of Hydrides of Elements of the Fourth Group of the Periodic System and of Their Organic Derivatives, by A. E. Finholt et al., J.A.C.S., November 1947, pp. 2692-6.